(12) United States Patent
Sheleheda et al.

(10) Patent No.: US 9,172,712 B2
(45) Date of Patent: Oct. 27, 2015

(54) METHOD AND SYSTEM FOR IMPROVING WEBSITE SECURITY

(75) Inventors: Daniel Sheleheda, Florham Park, NJ (US); Edward G. Amoroso, Andover, NJ (US); Cynthia Cama, Belmar, NJ (US); Junlan Feng, Basking Ridge, NJ (US); Gregory Leibolt, Apopka, FL (US); Sanjay Macwan, Marlboro, NJ (US); William O'Hern, Spring Lake, NJ (US); Valerie Torres, Summit, NJ (US); Yuhong Yu, Holmdel, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 969 days.

(21) Appl. No.: 12/575,018

(22) Filed: Oct. 7, 2009

(65) Prior Publication Data

US 2011/0083185 A1   Apr. 7, 2011

(51) Int. Cl.
*H04L 29/06* (2006.01)
*G06F 21/56* (2013.01)

(52) U.S. Cl.
CPC ............... *H04L 63/14* (2013.01); *G06F 21/56* (2013.01)

(58) Field of Classification Search
USPC ............................................. 726/22, 24, 25
See application file for complete search history.

(56) References Cited

U.S. PATENT DOCUMENTS

| | | | |
|---|---|---|---|
| 6,269,362 B1 | 7/2001 | Broder et al. | |
| 6,567,918 B1 | 5/2003 | Flynn et al. | |
| 6,671,714 B1 * | 12/2003 | Weyer et al. | 709/203 |
| 6,735,694 B1 | 5/2004 | Berstis et al. | |
| 7,559,016 B1 * | 7/2009 | Rakowski et al. | 715/229 |
| 7,865,953 B1 * | 1/2011 | Hsieh et al. | 726/22 |
| 7,904,345 B2 * | 3/2011 | Dworkin et al. | 709/225 |
| 8,260,914 B1 * | 9/2012 | Ranjan | 709/224 |
| 2002/0120648 A1 * | 8/2002 | Ball et al. | 707/511 |
| 2003/0172145 A1 * | 9/2003 | Nguyen | 709/223 |
| 2006/0069697 A1 * | 3/2006 | Shraim et al. | 707/102 |
| 2006/0092861 A1 * | 5/2006 | Corday et al. | 370/256 |
| 2006/0101069 A1 * | 5/2006 | Bell et al. | 707/103 R |
| 2007/0028239 A1 * | 2/2007 | Dyck et al. | 718/1 |
| 2007/0240076 A1 * | 10/2007 | Astala et al. | 715/800 |
| 2007/0245260 A1 * | 10/2007 | Koppert | 715/784 |
| 2007/0288589 A1 * | 12/2007 | Chen et al. | 709/217 |
| 2008/0133540 A1 * | 6/2008 | Hubbard et al. | 707/10 |

* cited by examiner

*Primary Examiner* — Benjamin Lanier
(74) *Attorney, Agent, or Firm* — Scott P. Zimmerman, PLLC

(57) ABSTRACT

A method for locating and monitoring websites is provided that includes finding websites and contained hyperlinks, downloading a first snapshot of a web page taken at a first time, and downloading a second snapshot of the web page taken at a second time later than the first time. The method also includes enabling a comparison of the first snapshot and the second snapshot. A system for monitoring websites is provided. The system includes means for enabling a comparison of the first snapshot and the second snapshot visually or through the use of content data from that web site. A computer-readable recording medium having recorded thereon an executable program is provided. The program when executed causes a processor to perform a method for monitoring websites.

12 Claims, 11 Drawing Sheets

METHOD AND SYSTEM FOR IMPROVING WEBSITE SECURITY

FIELD OF THE INVENTION

The present invention relates to website security, and more particularly to a system and method for monitoring websites for unauthorized activity.

BACKGROUND OF THE INVENTION

With the emergence of the World Wide Web (WWW), the use and utility of websites and web pages to hold and deliver content has defined the Internet to a large population of the world. This technology has been embraced not only on the Internet, but also within enterprise intranet networks. Many modern computers and network-attached devices (printers, routers, switches, etc.) can and often do host websites and deliver content via associated web pages. Many businesses are challenged to identify the myriad of web-enabled systems and services within their internal networking space. Additionally, it is very difficult to manage the content and format of both internal and external-facing websites.

Enterprise managers are challenged as to how to manage and identify the explosion of approved websites against the possibility of rogue websites, and/or defaced websites, within the business' internet and/or intranet presence.

SUMMARY OF THE INVENTION

An exemplary system provides automated tools that support the discovery of web servers, including virtual web hosting servers, within the enterprise. The exemplary system further captures images of web pages hosted on those websites. After capturing the web pages, the web pages may be converted into thumbnail images, also referred to herein as thumbnails, thumbshots, or snapshots. These thumbnails may then be visually reviewed by a user in any number of ways, including for example in a streaming tape or a hierarchical tree format.

An exemplary web thumbnail security system, also referred to herein as a web thumbnail system, may be adapted to find and capture web page images, and may thereby provide the user with a unique way to visually review websites and web page content found in an enterprise network. With the resulting thumbnail images, the user may be able to review web pages and detect anomalous or questionable content.

An exemplary system may be used to: 1) identify and catalog the servers and systems in the network that are running web services; 2) locate websites and pages with missing or broken links; 3) locate websites and pages that are not using approved formats; 4) detect rogue websites; 5) detect unsecured websites such as a network switch or router; 6) locate unsecured sensitive content; 7) identify web services running on unapproved systems; 8) detect inappropriate redirections to other websites; 9) detect defaced pages; and 10) detect pages and websites with possible virus or malware infections.

The exemplary system may be configured to capture the web pages of a known website on a regular basis to monitor for unplanned or inappropriate changes to the web pages.

A method for monitoring websites is provided that includes, among other things, downloading a first snapshot of a web page taken at a first time, and downloading a second snapshot of the web page taken at a second time later than the first time. The method also includes the feature of enabling a comparison of the first snapshot and the second snapshot. Additionally, and optionally, the system can also capture the detailed content of the web site including text, images and associated detailed information available on that site.

A system for monitoring websites is provided that includes means for downloading a first snapshot of a web page taken at a first time, and means for downloading a second snapshot of the web page taken at a second time later than the first time. The system also includes means for enabling a comparison of the first snapshot and the second snapshot. Additionally, and optionally, the system can also capture the detailed content of the web site at time 1, and then again at time 2 and compare the content changes.

A computer-readable recording medium having recorded thereon an executable program is provided. The program when executed causes a processor to perform a method for monitoring websites.

These and other advantages will be apparent to those of ordinary skill in the art by reference to the following detailed description and the accompanying drawings.

DETAIL DESCRIPTION

A web thumbnail system may provide an automated system to aid in discovering websites and capturing the image content of those websites. These thumbnail images are visually reviewed, using one of the supplied display methods or another alternative method. In this manner, the system aids in reviewing the content of these websites and aids in the understanding of the web environments within a business or enterprise.

Figure 1:
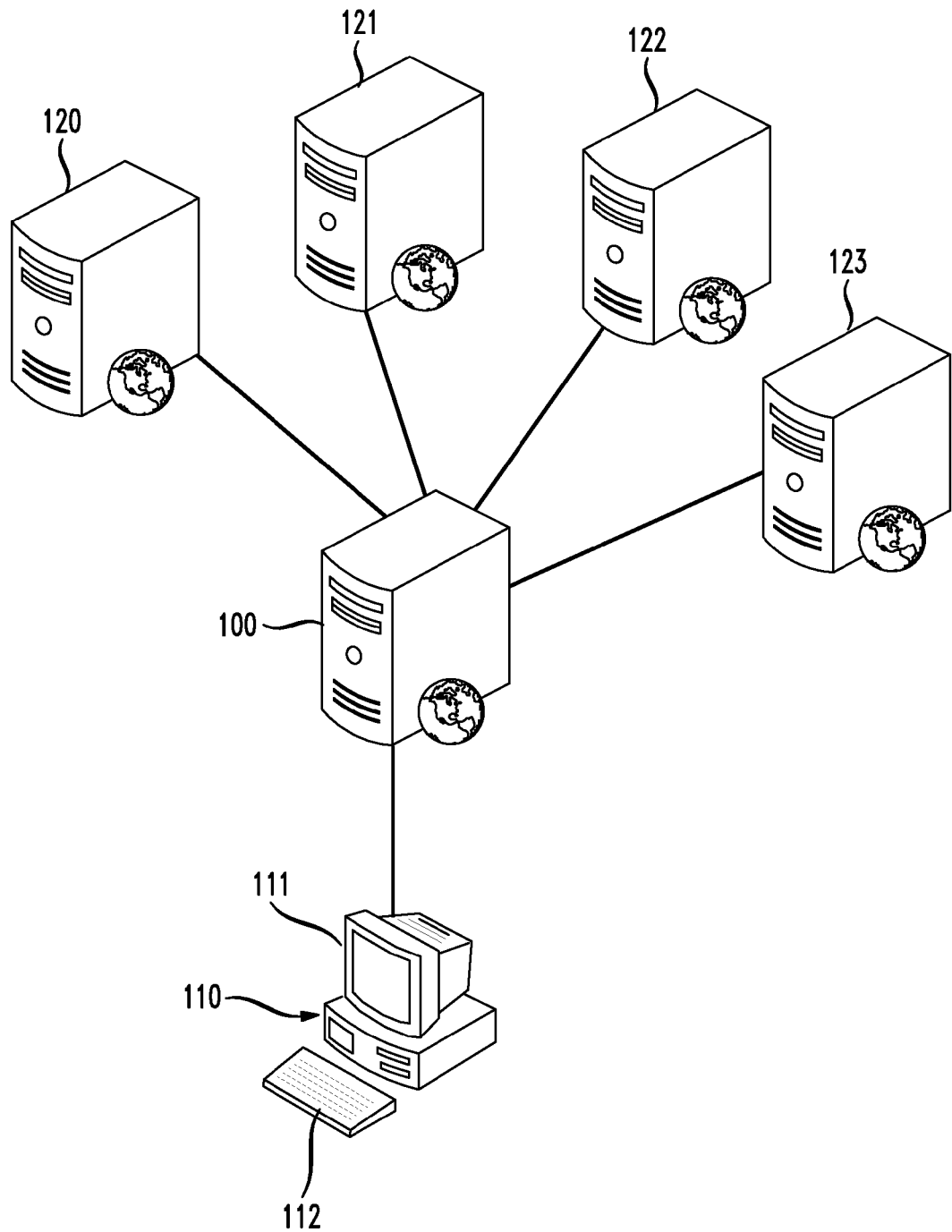
FIG. 1 is a schematic diagram of a system in accordance with an embodiment.

FIG. 1 illustrates an exemplary embodiment. Web track data collection system 100 (also referred to herein as system 100) may operate to collect data about websites and web pages presented by a business or enterprise. System 100 may be networked to servers 120, 121, 122 and 123. Each of servers 120, 121, 122 and 123 may have one or more websites which are monitored by system 100. Additionally, system 100 may monitor additional servers, either part of the same enterprise or business, associated with a sub-division of the enterprise or business, or associated with another enterprise or business. System 100 may connect to servers 120, 121, 122, 123 via an internet or intranet. Web track security information tool set 110 may connect to system 100 to organize and analyze the data collected by web track data collection system 100. Web track security information tool set 110 may include keyboard 112 and display 111 for use by an operator of web track information tool set 110. System 100 may be integrated with a web tracking system, for instance a web tracking system that provides a web crawler and web content download and management capability.

Figure 2:
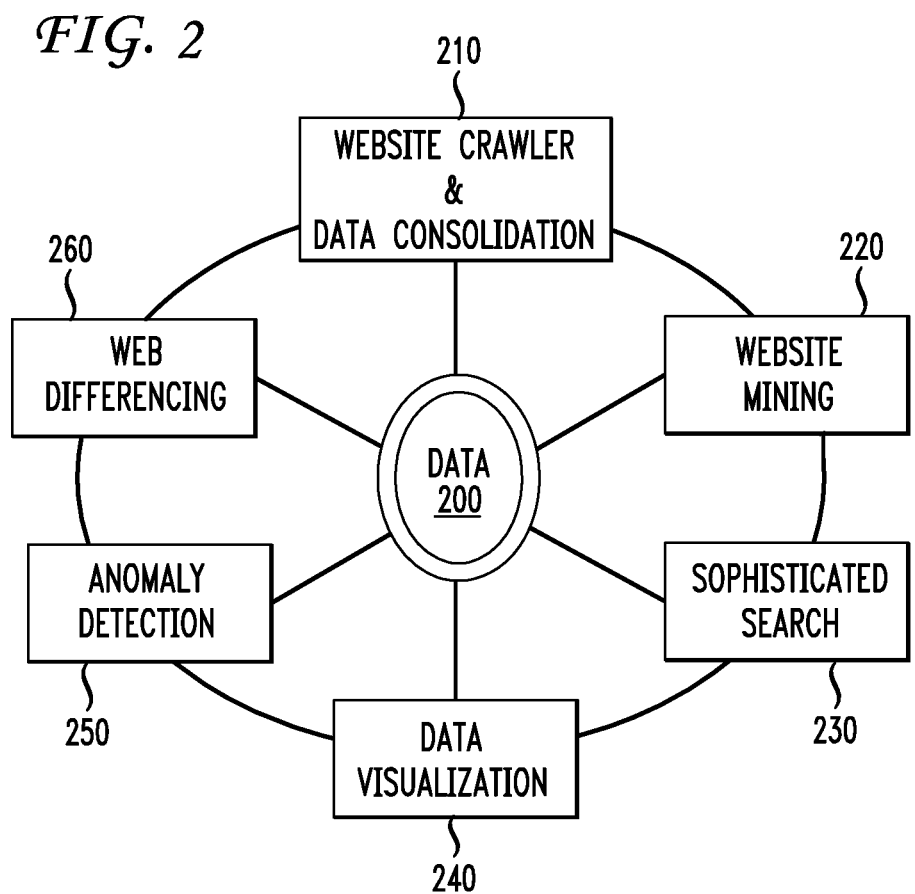
FIG. 2 is a schematic diagram of application modules and data in accordance with an embodiment.

FIG. 2 illustrates a functional diagram of an exemplary embodiment. Data 200, which may be collected by system 100, may be accessed by various hardware or software elements. Software that accesses data 200 may include modules and/or applications which may run on web track security information tool set 110. Website crawler and data consolidation 210 may direct system 100 in accessing servers 120, 121, 122, 123. Website mining 220 may control the downloading of web pages and/or snapshots of websites. Sophisticated search 230 may operate to enable a user to access data 200 using various Boolean connectors in conjunction with search terms selected by the user. Data visualization 240 may operate to analyze and/or display data 200 and/or metadata in a manner that is easily reviewed and analyzed by a user using display 111. Anomaly detection 250 may analyze data 200 to detect anomalous data and notify a user of web track security information tool set 110. Web differencing 216 may analyze data 200, and in particular may compare two snapshots of a web page taken at different points in time and identify and/or highlight the differences between the snapshots. Web differencing 260 may also present the identified differences to a user in a report and/or in a highlighted manner using the content information. Alternatively, the user may visually examine the two or more snapshot images to observe a change.

Figure 3:
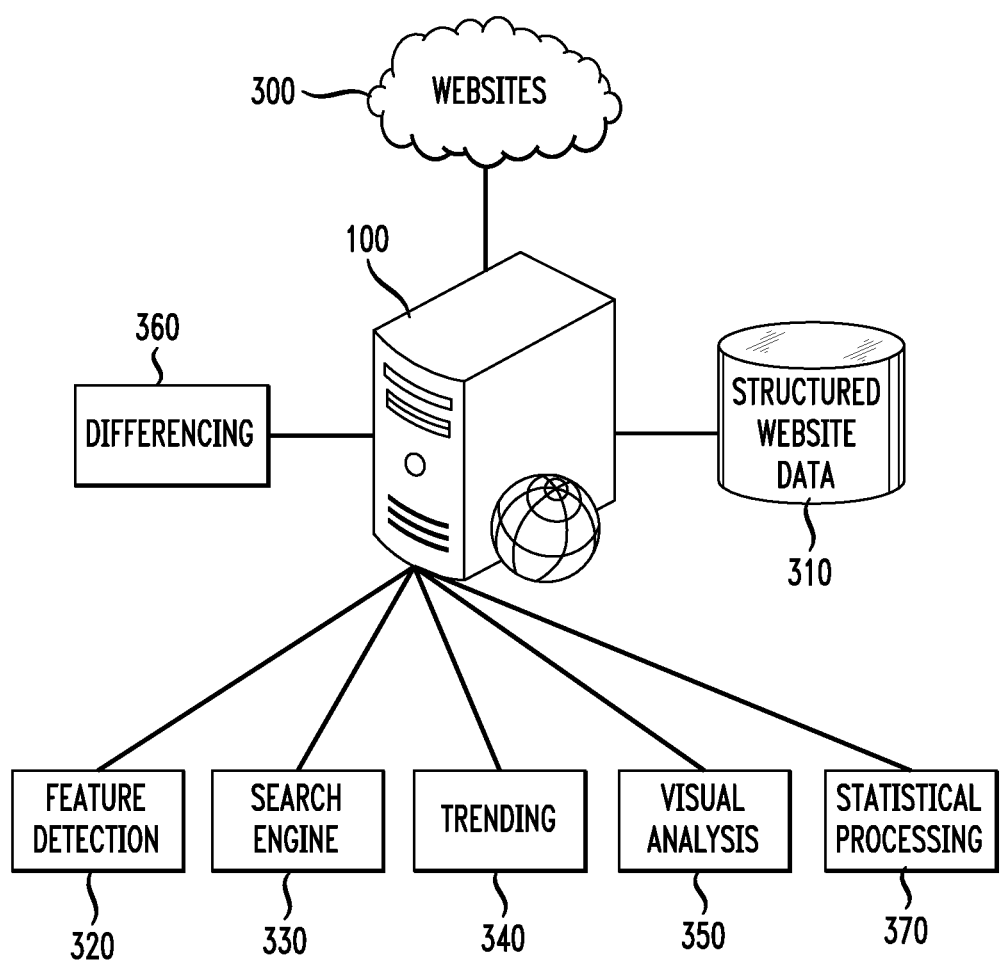
FIG. 3 is a schematic diagram of a system and application modules in accordance with an embodiment.

FIG. 3 illustrates another exemplary embodiment. In FIG. 3, system 100 monitors websites 300, which may be running on servers 120, 121, 122, and 123, or on other servers. Web track data collection system 100 is coupled to database 310, which includes structured website data. Feature detection 320 may be a module within system 100, or may alternatively be running on web track information tool set 110 of FIG. 1. Feature detection 320 may operate to track features of monitored websites. Features can be thought of as keywords or phrases that the user is interested in monitoring. If a feature is detected, this item is marked and can be used for alarming or trending purposes. Search engine 330 may be a module within system 100, or may alternatively be running on web track information tool set 110 of FIG. 1, and may access database 310 for searching functions. Search engine 330 may be an application, module, or software running on a personal computer, server, or other network device. Search engine 330 in FIG. 3 may operate to run sophisticated search 230 shown in FIG. 2. Trending 340 may be a software, application, or module running on a computer or server and may operate to identify trends in websites and/or web pages. In particular, web trending 340 may operate to provide a frequency histogram showing a document frequency or changes in websites and/or web pages. Trending 340 may provide the function of anomaly detection 250 shown in FIG. 2. Visual analysis 350 may operate to provide illustrations of data and changes in websites and web pages. Visual analysis 350 may operate to provide the function of data visualization 240 shown in FIG. 2. Differencing 26 may identify and/or highlight differences between web pages represented by webshots that are downloaded at different times or though the use of detailed content information. Differencing 360 may operate to perform the functionality of web differencing 260 shown in FIG. 2. Statistical processing 370 may operate to illustrate statistical information relating to the data included in database 310. Statistical processing 370 may operate to provide the functionality of database 310. Statistical processing 370 may operate to provide the functionality of website mining 220 shown in FIG. 2.

Figure 4:
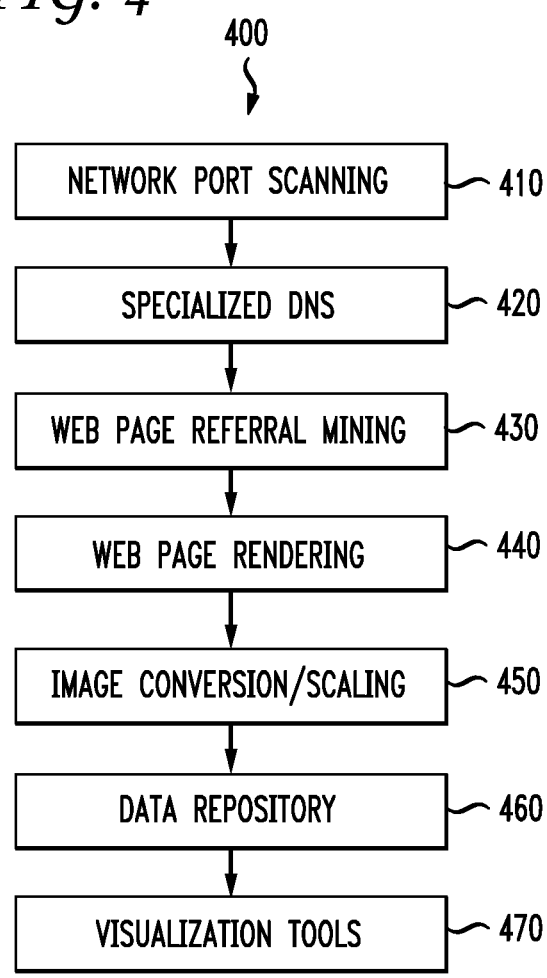
FIG. 4 is a flow chart illustrating a method in accordance with an embodiment.

A web thumbnails system may be implemented in a modular format. Method 400 is shown in FIG. 4 including various sub-steps. Each sub-step may be optional in method 400, or may be performed in an alternative order. The flow in method 400 starts at network report scanning 410, which may identify available ports in servers operating on a business or enterprise intranet. Network report scanning 410 may include scanning to identify ports open to a network, and identifying IP addresses of computers accessible via the ports to identify web pages. Network report scanning 410 may include identifying at least one of a host name and a domain name associated with an identified IP address. A networking port scanning module may provide an optional web services discovery interface to discover web servers running on a network. Port scanning applications may be configured to send service discovery packets to the destination network looking for responses on service ports. For web services, these may include TCP ports 80, 8080 and 443. However, the configuration of the port scanning module is flexible and can be extended or reduced based on the networks being scanned.

The results of a discovery scan may provide a listing of IP addresses that responded to the configured TCP port requests. The resulting listing of IP addresses captures the candidate systems for further investigation and may be passed to the next module. Network report scanning 410 may be optional in system 100, which alternatively can be "seeded" with a listing of IP addresses, hostnames or website addresses, if discovery is not required or desired.

A web thumbnails system may optionally scan a defined network/subnetwork looking for systems with open web ports. This type of scanning could impact firewalls and other systems. An Intrusion Detection System or other security monitor may flag the scanning activity, and therefore it may be advisable for an operator of a web thumbnails system to inform a cyber security operations team of planned scanning activities.

Figure 5:
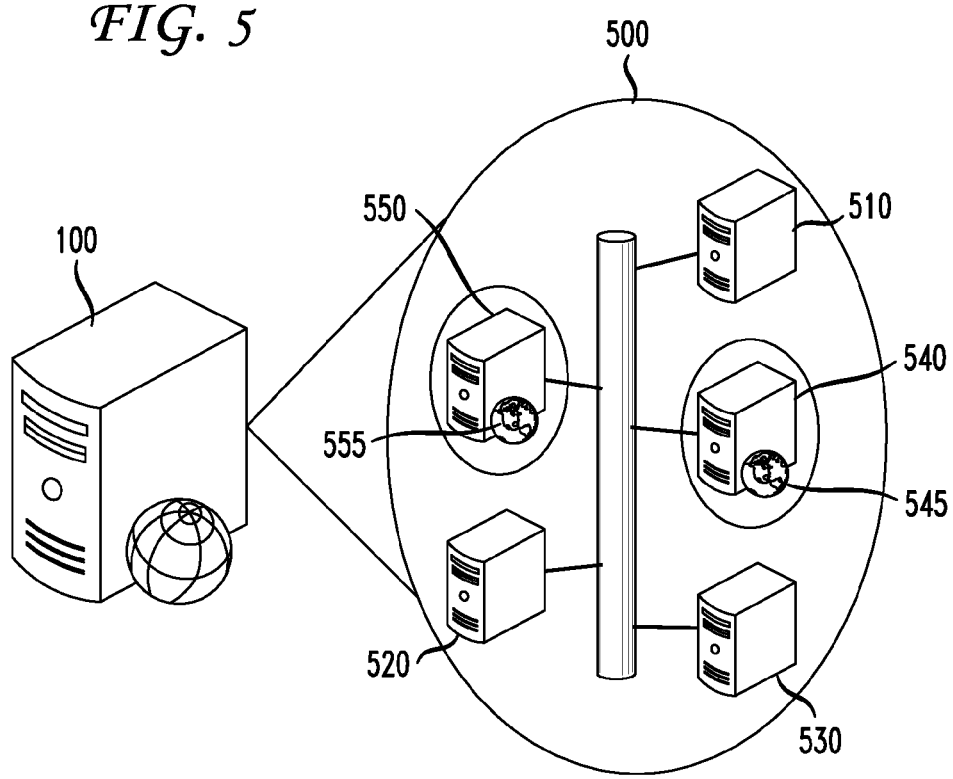
FIG. 5 is a schematic diagram of a system in accordance with an embodiment.

FIG. 5 illustrates a functionality of network port scanning 410 shown in FIG. 4. In FIG. 5, system 100 connects to enterprise intranet 500, which includes servers 510, 520, 530, 540 and 550. Web track data collection system 100 may operate to perform the operation of network port scanning 410 to identify systems within enterprise intranet 500 that have open web ports. Web track data collection system 100 may identify web ports 80, 8080, and 443, for example. Web track data collection system 100 may identify server 540 as having open port 545, and also may identify server 550 as having open port 555.

Specialized domain name system 420 (also referred to as Specialized DNS 420) of FIG. 4 may operate to access a computer and determine if a computer is serving or providing multiple websites. Two types of IP-to-hostname resolutions may be used. The first is use of standard DNS processing for use with external (non-enterprise) site processing. The second is for use with internal enterprise site processing, and may be required to discover "virtual" web hosting sites.

In standard DNS processing, the IP addresses provided from a network scanning module are processed through a domain name system in an effort to return a hostname or a domain name. This may improve the results of a later web page rendering request. Use of an IP address in the web request may provide a resulting web page. Use of the IP addresses corresponding hostname and/or domain name may provide better results in the rendering stage as the subject website will pass the host attribute along to the destined web site, which in the case of virtual web hosting sites will allow it to display the named web site home page. If the DNS query cannot return a hostname and/or domain name, the system may proceed with the rendering request using the IP address. Standard DNS processing does not require a specialized DNS system.

Specialized DNS 420 may discover virtual web hosting sites within an enterprise. Virtual web hosting may enable multiple websites to be supported on a single IP address. To access one of the multiple websites at a single IP address, the web request may need to provide the specific URL or domain name in the host field. The IP address or the hostname may not be used to locate these websites because the virtual hosting system may not know which website is being requested. If the virtual web hosting system is configured with a default redirection, that single website will be rendered, and the remaining websites on that system may not be found. If the virtual web hosting system does not have a default redirection in place, no web pages will be returned.

With standard DNS processing, there may be no easy method to identify all domain names associated with a single IP address (supplied from the network port scanning module). Accordingly, specialized DNS 420 may be used to determine all domain names (or aliases) associated with an IP address, and system 100 may use this list of aliases during the rendering process.

Figure 6:
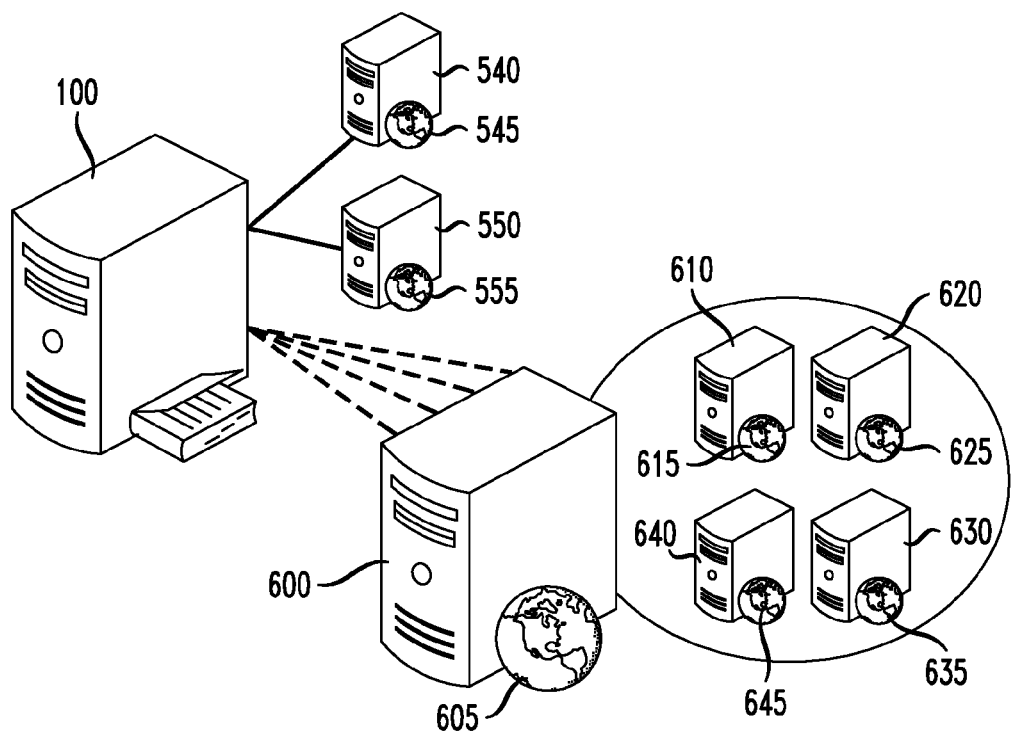
FIG. 6 is a schematic diagram of a system in accordance with an embodiment.

FIG. 6 illustrates the function of specialized DNS 420 of FIG. 4. Web track data collection system 100 may identify servers or computers having open ports as shown in FIG. 5. In particular, system 100 may identify server 540 having open port 545 and server 550 having open port 555 (in this reference open ports represent a web server port). Additionally, system 100 may identify server 600 having an open port 605. System 100 may also identify that server 600 is operating to present multiple web sites. System 100 may exercise a DNS lookup of this IP (internet protocol) to acquire a host name. System 100 may use the host name to query for alias records. System 100 may also reverse the DNS process to identify alias host names which effectively work as URL addresses. For example, system 100 may identify that server 600 is operating to present virtual server 610 having a virtual web site 615, virtual server 620 having virtual web site 625, virtual server 630 having virtual server 635 and virtual server 640 having virtual web site 645. In this manner, server 600 may present four virtual servers, each virtual server having a separate web site defined with different alias DNS names which accordingly can present a different web page to the internet or intranet. System 100 operating specialized DNS 420 may identify all of the websites and web pages operating on server 600. If the DNS query cannot return a hostname and/or domain name, the system may proceed with the rendering request using the IP address.

Web page referral mining 430 of FIG. 4 may operate to identify hyperlinks on a web page and/or to download a web page which is identified by a hyperlink. Web page referral mining 430, also referred to herein as a hyperlink identification engine, may detect website pages that are "linked" to any given page. For example, web page referral mining 430 may start at a home page of a particular website and scan that web page to identify any "hyperlinks" or referral pages found on that homepage. System 100 may add these referral page addresses into the collection process.

System 100 may define this mining in terms of layers. For example, a layer 1 scan may only render the home pages and will not render any hyperlinks. A layer 2 scan may locate the homepages and may also render any hyperlink pages that were included on the homepage. A layer 3 scan may continue to track these links in an expanding tree. A user of the system may set the mining layer as a configuration option prior to the execution of this system.

Web page referral mining 430 may identify not only the pages contained within the website, but also show what other websites are available via these hyperlinks. Web page referral mining 430 may execute a hyperlink on the web page to upload a hyperlinked web page, and download a snapshot of the hyperlinked web page. This may enable detection of inappropriate links connected to the enterprise sites. Web page referral mining 430 may track what links are available at what layers in the tree. The system may also include controls to suppress external website rendering if desired by the user.

Figure 7:
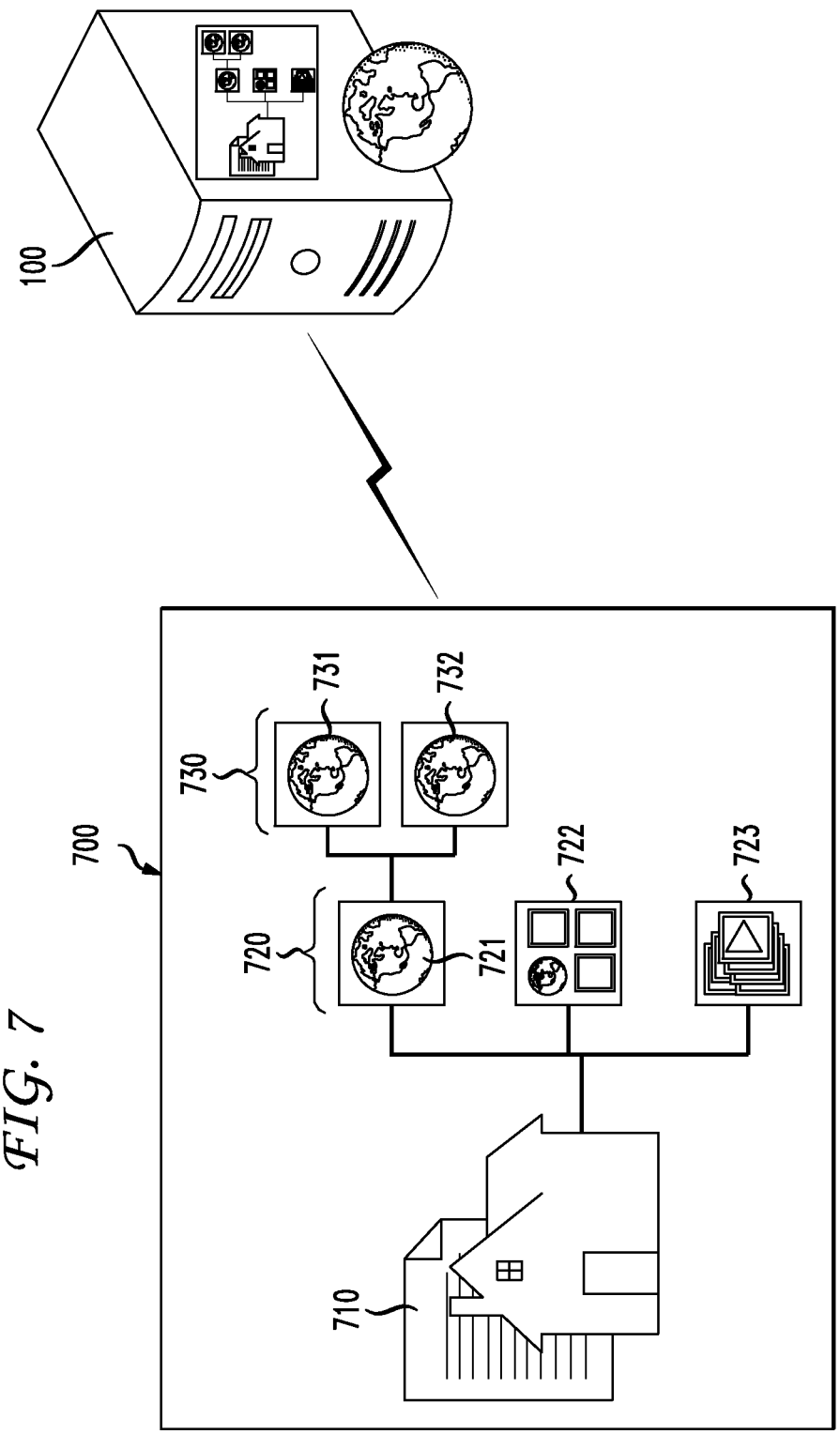
FIG. 7 is a schematic diagram of a system in accordance with an embodiment.

FIG. 7 illustrates the function of web page referral mining 430. In FIG. 7, system 100 may automatically extract hyperlinked references. In particular, system 100 may identify and download a snapshot of homepage 710, and may identify hyperlinks on homepage 710. System 100 may identify web pages 721, 722, and 723 in web page layer 720 comprised of web pages hyperlinked to homepage 710. System 100 may also identify web pages 731 and 732, in web page layer 730, that are hyperlinked to web page 721. System 100 may maintain all of the identified web pages in a tree layer model in a memory, thereby illustrating the hierarchical nature of the website. System 100 may also capture externally hosted web pages.

Web page rendering 440 of FIG. 4 may operate to create an image of a website or web page, which may be readily downloaded or converted into a thumbnail and downloaded. The web thumbnails system may automatically go to each of the listed candidate websites (identified by IP address, hostname, listing of virtual hosting domain names, or manually defined URL's) and capture the page displayed at that address. The rendering engine is analogous to a user pressing the print screen key on their personal computer with the web browser set to display in full screen. The rendering engine will capture this screen image after a user configurable timeout. The resulting images can include: 1) the web page image; 2) a web page status screen; 3) a blank screen; 4) overlay screens such as popup windows; and 5) anti-virus and/or malware detection messages appearing on a top edge of a web page. The anti-virus and/or malware detection message may indicate that the processed website has triggered the detection of some malware based on the antivirus system running on the web thumbnails system. The web page images may then be passed to the next component in this architecture.

Figure 8:
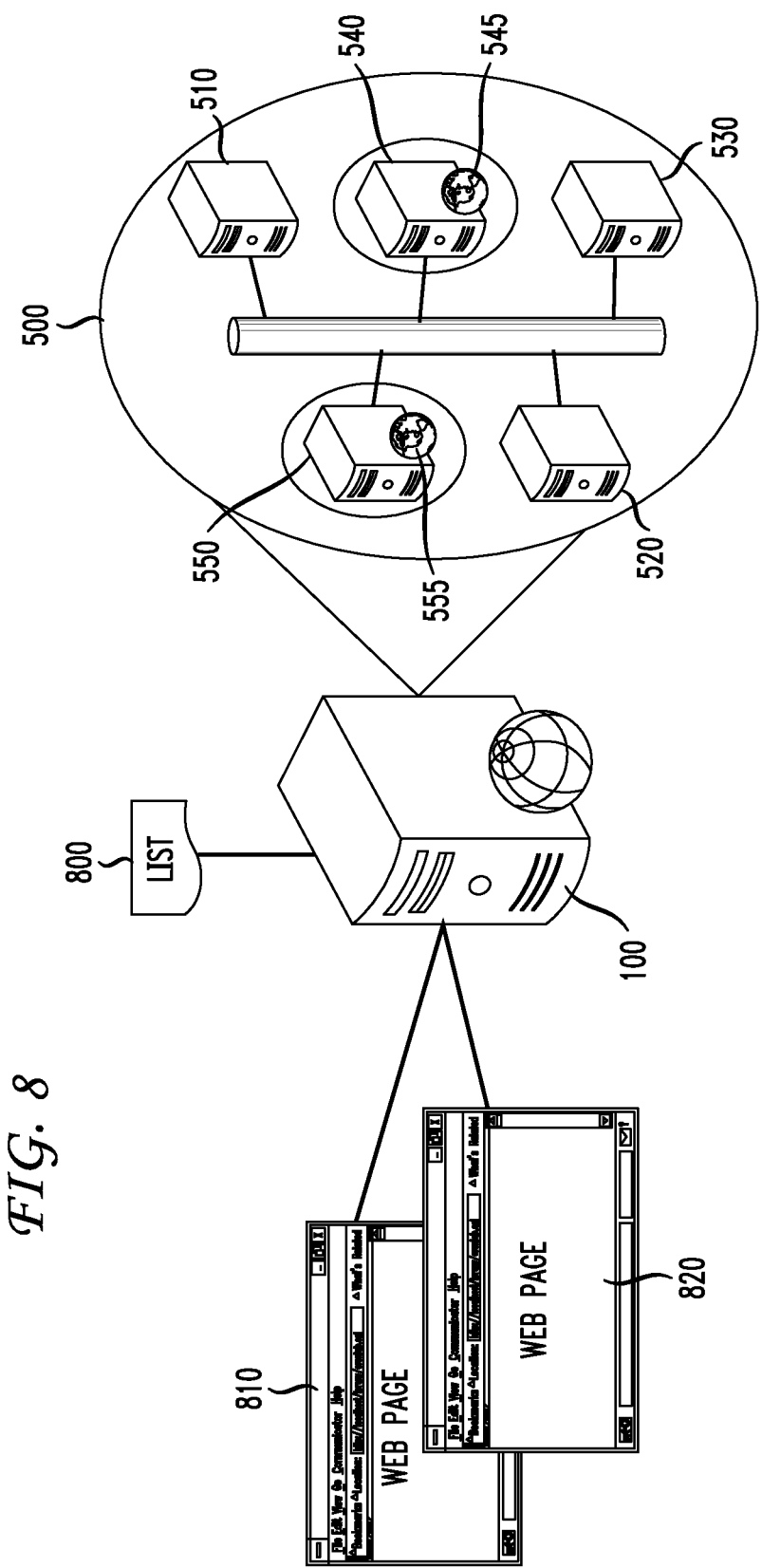
FIG. 8 is a schematic diagram of a system in accordance with an embodiment.

FIG. 8 further illustrates web page rendering 440, which may also be referred to as a website collection function. System 100 may connect to enterprise intranet 500, which includes servers 510, 520, 530, 540 and 550. Server 540 may have an open port 545, and server 550 may have open port 555. System 100 may include list 800 of authorized websites and/or web pages. System 100 may include an automated tool using a standard web browser to contact the destination web server pages in list 800. System 100 may download each identified web page and capture an image of the page, also referred to herein as a snapshot or webshot. System 100 may capture web page 810 and web page 820. System 100 may also handle pop-up conditions such as certificate errors, and may be used to enable a delta processing or differencing function. System 100 may take a webshot of a website or web page at an initial time as a baseline.

Image conversion/scaling 450 of FIG. 4 may convert an image to an easily downloaded file type or format, and also may scale an image to a thumbnail or other appropriate size. Image conversion/scaling 450 may have user configurable options to set the size of the image.

Data repository 460 of FIG. 4 may save data including snapshots, thumbnail snapshots and relational data between different web pages. Thumbnail images may be retained in tree file structure, or any other appropriate file management system. Data repository 460 may utilize a database, and/or may provide additional features such as annotations and alternative access methods. A database retention of thumbnail images may utilize a relational database structure enabling the collection of user annotations and notes.

Visualization tools 470 of FIG. 4 may operate to display data and/or snapshots of web pages for evaluation by an operator. In particular, visualization tools 470 may display a series of snapshots of different web pages of an enterprise or business in either a tree format illustrating the hierarchy of the web pages or in a streaming tape format in which the snapshots are scrolled across the screen, for example from left to right.

The method may include downloading another snapshot of the web page taken at another time, and enabling a comparison of the later snapshot with an earlier snapshot. The method may include identifying a difference between the first and second snapshots, and displaying the difference in a highlighted manner. The method may include storing a first text associated with the first snapshot of the web page, and storing a second text associated with the second snapshot of the web page. The method may further include identifying the difference when the first text differs from the second text. In the method, the text associated with the web page may be metadata associated with the web page. The method may include: locating missing, broken, or misdirecting links: detecting unapproved, defaced, or unsecured web pages; or detecting web pages with malware or viruses.

In the streaming tape format, the images are displayed in a ticker tape like display with the images automatically scrolling across a web page. There may be controls for adjusting the speed of the scrolling and allowing the user to pause or resume the scroll. Clicking on an image may launch a new web browser window directly to that web page in real-time.

Figure 9:
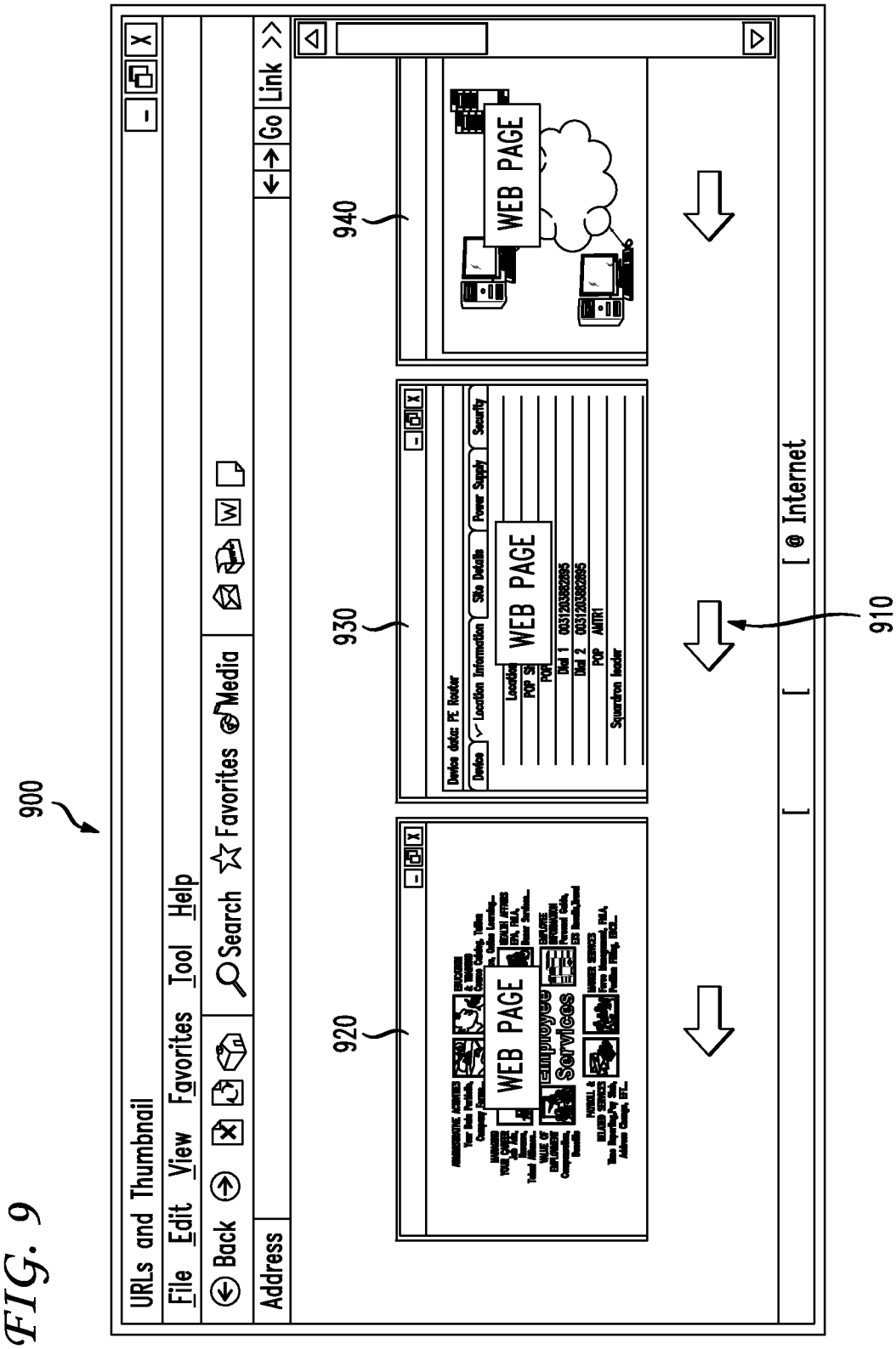
FIG. 9 is a screen shot of a display in accordance with an embodiment.

FIG. 9 illustrates a streaming tape format, also referred to herein as an image tape method. System 100 may execute visualization tool 470 by an image tape method. For instance, system 100 may display image 900 which is an image tape, and which may provide a ticker tape-like display. Image 900 may automatically scroll web page images 920, 930 and 940 (also referred to herein as webshots) in a direction 910 across the screen. Image 900 may include a direct hyperlink to the live web page. For instance, image 900 may enable a user to select webshot 920 with a mouse or other interface and open a browser showing the web page from which webshot 920 was taken. In this manner, an operator or security specialist may view the automatic scrolling of webshots 920, 930, and 940. If the user or security specialist identifies an anomaly in any of the webshots, the security specialist may select the identified webshot with a mouse and open a browser to further evaluate the current status of the web page.

Figure 10:
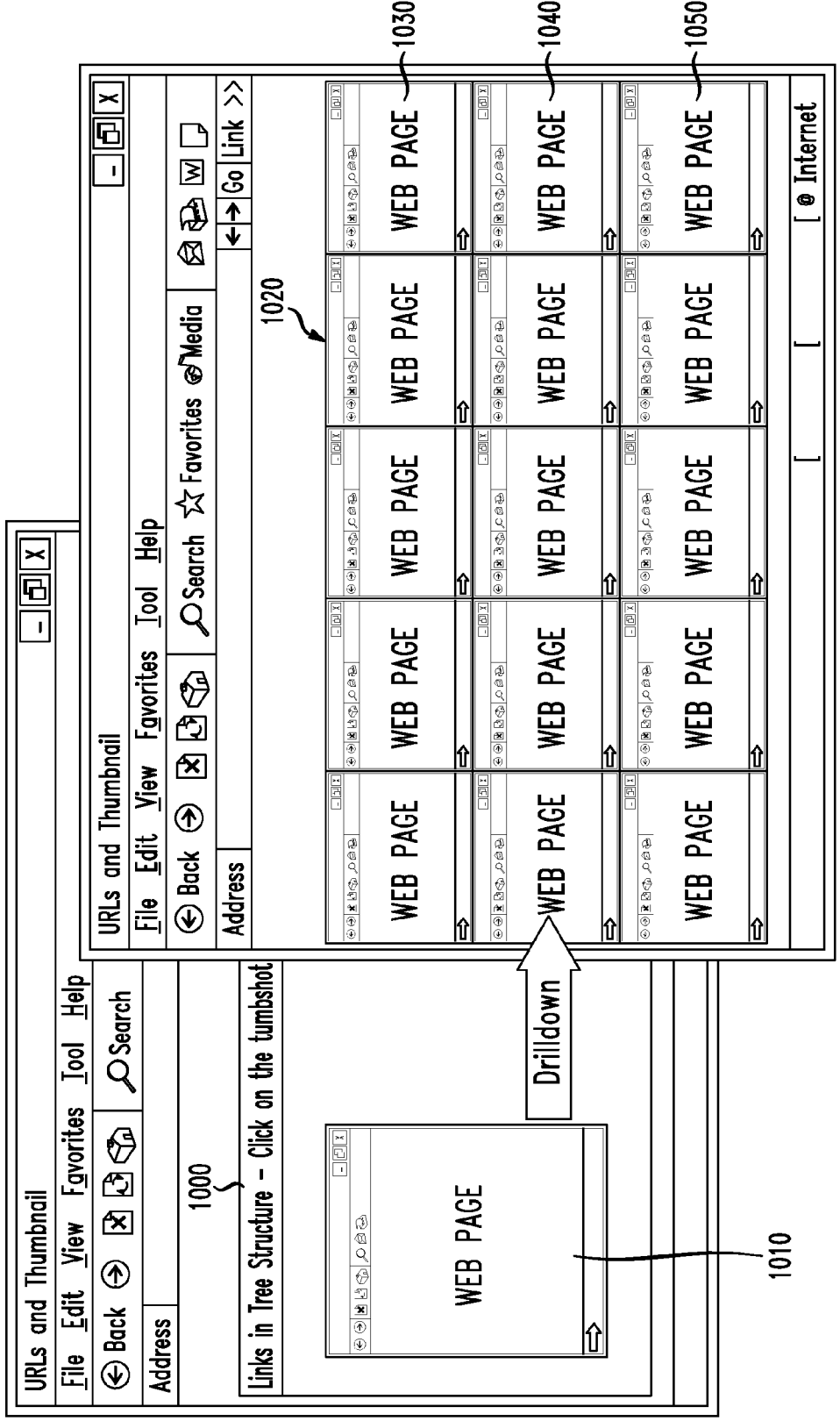
FIG. 10 is a screen shot of a display in accordance with an embodiment.

FIG. 10 illustrates an alternative exemplary embodiment of visualization tool 470 using a tree format. The tree format may show the image in a row and column view. The webshots are presented in hierarchical structure with parent pages shown first and child pages available as the user drills down. The number of drill-down levels may be controlled by web page referral mining 430. A tree format view may display all web pages seen at a particular level. Clicking on thumbnails may launch a new web browser directly to that web page in real-time. In FIG. 10, image 1000 includes an image of webshot 1010. Webshot 1010 may illustrate a snapshot of a homepage or other web page having one or more hyperlinks embedded therein. A user or security specialist may select webshot 1010 or may just activate a drill down function to open image 1020. Image 1020 may open while simultaneously closing image 1000, or alternatively image 1020 may open in addition to image 1000 in a layered or tiled format. Image 1020 may include webshots 1030, 1040, 1050, etc. Webshots 1030, 1040, and 1050 may be webshots of web pages that are hyperlinked to the web page shown in webshot 1010. In this manner, a user or security specialist may be able to recognize and/or use the hierarchical or tree structure of a website. In the tabulated tree format of FIG. 10, a row and column image view may be displayed and the drill down level structure of a website may be easily shown. Additionally, each of webshots 1010, 1030, 1040 and 1050 may include a hyperlink to the active web page illustrated in the snapshot, as discussed above in regard to FIG. 9.

Network routes and firewall configurations may need to allow for normal web browsing for the web thumbnails system to operate. No additional special ports or routing support may be required. The web thumbnails system may record execution statistics in log files.

Geographically distributed web thumbnail hosts may provide improved performance by reducing network latency. In some sub-networks there may be virtually no web services, while other networks may have a significant amount. Network latency delays may vary depending on the wide area network topology and bandwidth. The performance of each web server also may vary. An option may be provided to configure the thumbnail process to build in a delay for slow networks and servers, as well as to handle SSL (Secure Sockets Layer) certificate acceptance processing. This type of processing uses automation to detect prompts such as pop-up messages or intervening screens. Once detected, the automation will select the correct button or hyperlink to "accept" the warning message allowing the browser to continue to the web site or page.

Figure 11:
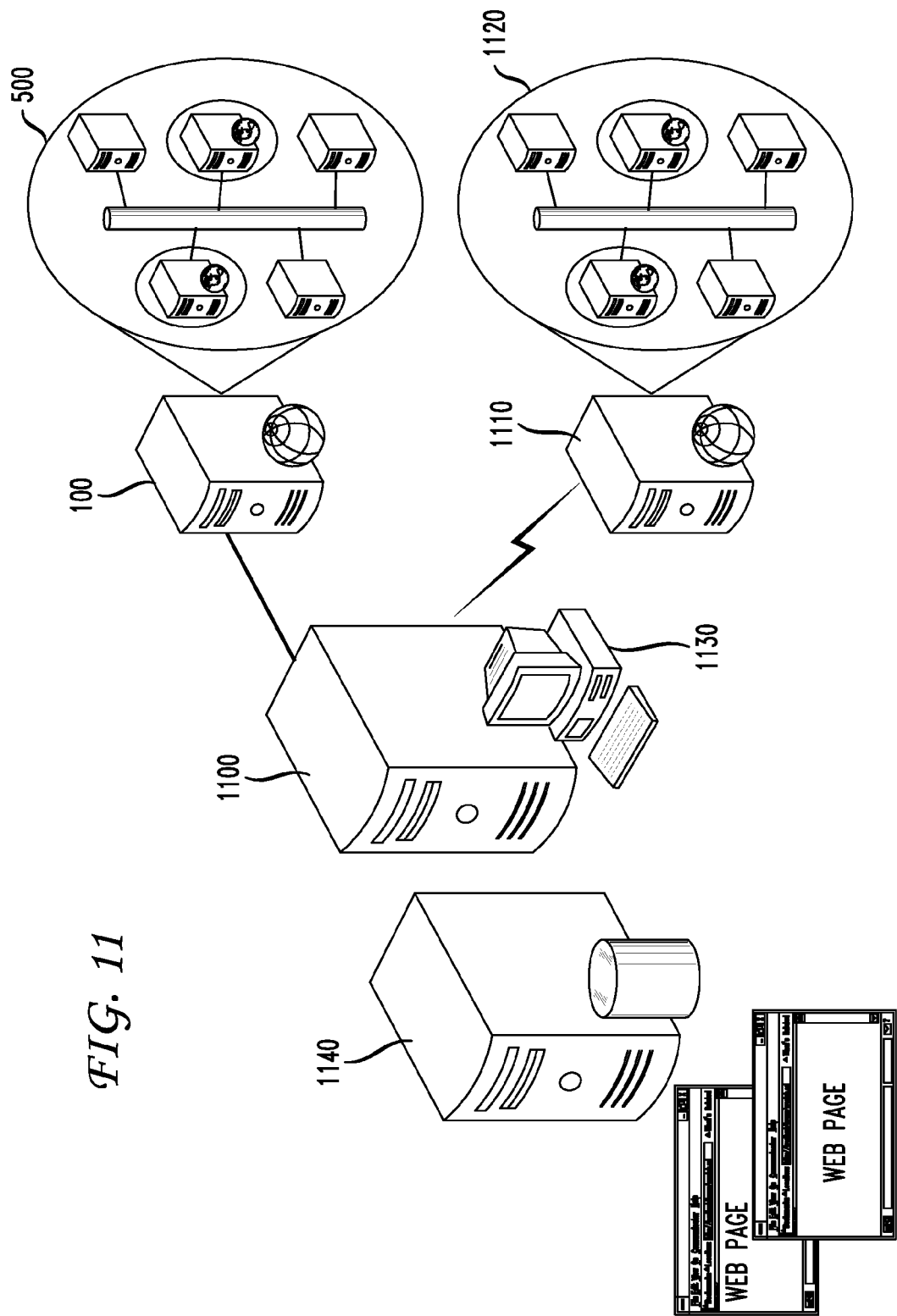
FIG. 11 is a schematic diagram of a system in accordance with an embodiment.

FIG. 11 illustrates another exemplary embodiment. In FIG. 11, manager system 1100 controls system 100, and also controls agent system 1110. Agent system 1110 operates to monitor intranet 1120. Alternatively, intranet 1120 may represent a subset of the intranet, or an externally operated website. Manager system 1100 may include a human interface 1130, which may in turn include a computer, server, display, and/or keyboard. Manager system 1100 may also include a server 1140, which may operate as a database or other memory storage.

The method may be performed by a plurality of client servers. Large scale captures can be optimized through the use of multiple collection machines. Virtual hosts may also be utilized in this implementation providing significant associated cost benefits. A thumbnails processing system may use any appropriate operating system. A thumbnail processing system may be deployed on a physical system or on a virtual system (e.g., VMware). The web thumbnail system may logically bind to the primary display screen of that system during its execution. Accordingly, concurrency is achieved though the use of multiple collection servers running in parallel. Serialized jobs queues can also be implemented based on scheduled collection time windows or semaphore locking. The scheduled collection allows for a web site to be automatically processed at a predetermined day and time. The use of semaphore is used to ensure thumbnail job 1 to be fully completed prior to moving on to thumbnail job 2 which allows more effective use of the web thumbnails collection hardware.

A graphical user interface (GUI) to manage the setup and execution of the web thumbnails collection jobs may enable all configuration options, and may manage the collection schedule. The GUI may also control multiple collector machines or agents. An alternative GUI for a web thumbnails system may utilize Flash programming.

Figure 12:
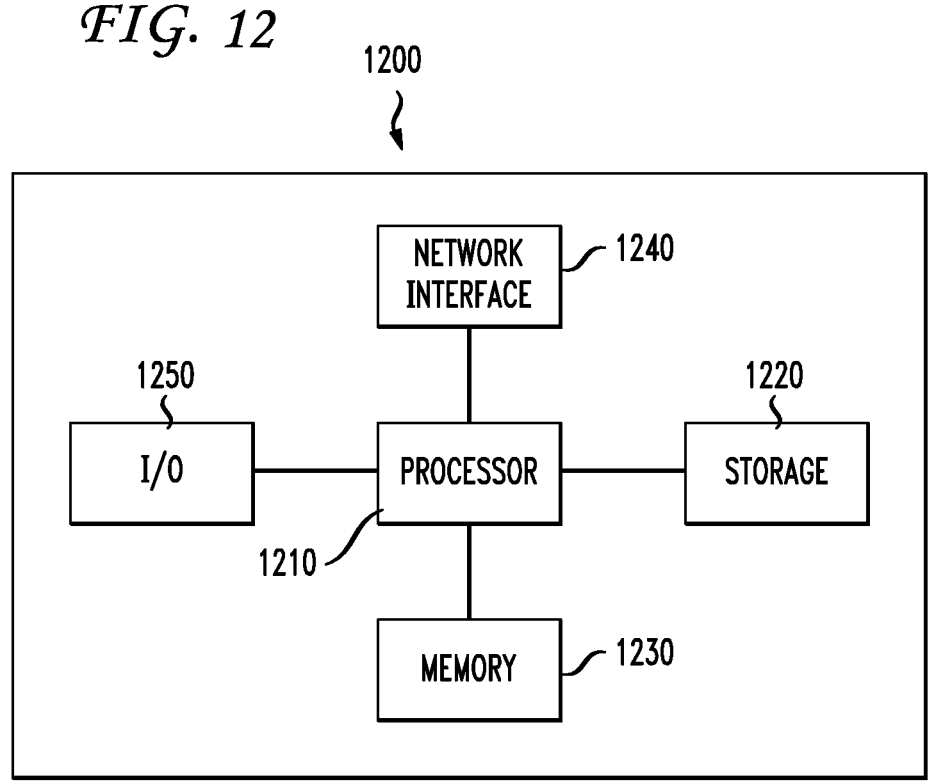
FIG. 12 is a block diagram of a computer in accordance with an embodiment.

FIG. 12 is a high level block diagram of a computer in accordance with an embodiment. The computer 1200 can, for example, operate as any of the entities in FIG. 1, including web track data collection system 100, servers 120, 121, 122 and 123, and web track security information tool set 110. Additionally, computer 1200 can perform the steps described above (e.g., with respect to FIG. 4). Computer 1200 contains processor 1210 which controls the operation of the computer by executing computer program instructions which define such operation, and which may be stored on a computer-readable recording medium. The computer program instructions may be stored in storage 1220 (e.g., a magnetic disk, a database) and loaded into memory 1230 when execution of the computer program instructions is desired. Thus, the computer operation will be defined by computer program instructions stored in memory 1230 and/or storage 1220 and computer 1200 will be controlled by processor 1210 executing the computer program instructions. Computer 1200 also includes one or more network interfaces 1240 for communicating with other devices, for example other computers, servers, or websites. Network interface 1240 may, for example, be a local network, a wireless network, an intranet, or the Internet. Computer 1200 also includes input/output 1250, which represents devices which allow for user interaction with the computer 1200 (e.g., display, keyboard, mouse, speakers, buttons, webcams, etc.). One skilled in the art will recognize that an implementation of an actual computer will contain other components as well, and that FIG. 12 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

We claim:

1. A method for monitoring websites, comprising:
   identifying, by a domain name server, a port open to a network;
   identifying, by the domain name server, a single Internet Protocol address associated with another server accessible from the port open to the network;
   querying, by the domain name server, a domain name resolution for the single Internet Protocol address;
   retrieving, by the domain name server, a host name having the domain name resolution with the single Internet Protocol address;
   requerying, by the domain name server, the domain name resolution for the host name;
   retrieving, by the domain name server, multiple alias records having the domain name resolution with the host name;
   determining, by the domain name server, the single Internet Protocol address associated with the another server, accessible from the port open to the network, virtually hosts multiple domain names in response to the multiple alias records having the domain name resolution with the host name;
   identifying, by the domain name server, web pages associated with each one of the multiple domain names virtually hosted by the another server;
   downloading, by the domain name server, each one of the web pages associated with each one of the multiple domain names at a first time;
   generating, by the domain name server, first thumbnail images of the each one of the web pages;
   associating, by the domain name server, the first thumbnail images to the first time in a database;
   downloading, by the domain name server, the each one of the web pages associated with each one of the multiple domain names at a second time later than the first time;
   generating, by the domain name server, second thumbnail images of the each one of the web pages at the second time;
   associating, by the domain name server, the second thumbnail images to the second time in the database;
   processing, by the domain name system, the first thumbnail images for display in a ticker tape that scrolls across a display screen;
   processing, by the domain name system, the second thumbnail images for the display in the ticker tape;
   comparing, by the domain name server, the first thumbnail images to the second thumbnail images;
   determining, by the domain name server, an image difference between corresponding ones of the first thumbnail images and the second thumbnail images; and
   processing, by the domain name system, the image difference for the display.

2. The method of claim 1, further comprising identifying a hyperlink to a linked web page.

3. The method of claim 2, further comprising adding a referral address of the linked web page to a list of addresses to download.

4. The method of claim 2, further comprising downloading the linked web page.

5. The method of claim 4, further comprising generating a thumbnail image of the linked web page.

6. The method of claim 1, further comprising determining a textual difference between the corresponding ones of the first thumbnail images and the second thumbnail images.

7. The method of claim 1, further comprising locating a misdirecting link.

8. A system for monitoring websites, comprising:
   a processor; and
   a memory storing instructions that when executed cause the processor to perform operations, the operations comprising:
   identifying a server with a port open to a network;
   identifying a single Internet Protocol address associated with the server accessible from the port open to the network;
   querying a domain name resolution for the single Internet Protocol address;
   retrieving a host name having the domain name resolution with the single Internet Protocol address;
   requerying the domain name resolution for the host name;
   retrieving multiple alias records having the domain name resolution with the host name;

determining the single Internet Protocol address associated with the server, accessible from the port open to the network, virtually hosts multiple domain names in response to the multiple alias records having the domain name resolution with the host name;

identifying web pages associated with each one of the multiple domain names virtually hosted by the server;

downloading each one of the web pages associated with each one of the multiple domain names at a first time;

generating first thumbnail images of the each one of the web pages;

associating the first thumbnail images to the first time in a database;

downloading the each one of the web pages associated with each one of the multiple domain names at a second time later than the first time;

generating second thumbnail images of the each one of the web pages at the second time;

associating the second thumbnail images to the second time in the database;

displaying the first thumbnail images in a ticker tape that scrolls across a display screen;

displaying the second thumbnail images in the ticker tape;

comparing the first thumbnail images to the second thumbnail images;

determining an image difference between corresponding ones of the first thumbnail images and the second thumbnail images; and displaying the image difference.

9. The system of claim 8, wherein the operations further comprise highlighting a textual difference between the corresponding ones of the first thumbnail images and the second thumbnail images.

10. The system of claim 8, wherein the comprise displaying a graphical control for controlling a speed of scrolling of the ticker tape.

11. The system of claim 8, wherein the operations further comprise displaying a hyperlink that corresponds to each one of the first thumbnail images.

12. A memory storing instructions for monitoring websites, which, when executed by a processor, cause the processor to perform operations, the operations comprising:

identifying, by a domain name server, a port open to a network;

identifying, by the domain name server, a single Internet Protocol address associated with another server accessible from the port open to the network;

querying, by the domain name server, a domain name resolution for the single Internet Protocol address;

retrieving, by the domain name server, a host name having the domain name resolution with the single Internet Protocol address;

requerying, by the domain name server, the domain name resolution for the host name;

retrieving, by the domain name server, multiple alias records having the domain name resolution with the host name;

determining, by the domain name server, the single Internet Protocol address associated with the another server, accessible from the port open to the network, virtually hosts multiple domain names in response to the multiple alias records having the domain name resolution with the host name;

identifying, by the domain name server, web pages associated with each one of the multiple domain names virtually hosted by the another server;

downloading, by the domain name server, each one of the web pages associated with each one of the multiple domain names at a first time;

generating, by the domain name server, first thumbnail images of the each one of the web pages;

associating, by the domain name server, the first thumbnail images to the first time in a database;

downloading, by the domain name server, the each one of the web pages associated with each one of the multiple domain names at a second time later than the first time;

generating, by the domain name server, second thumbnail images of the each one of the web pages at the second time;

associating, by the domain name server, the second thumbnail images to the second time in the database;

processing, by the domain name system, the first thumbnail images for display in a ticker tape that scrolls across a display screen;

processing, by the domain name system, the second thumbnail images for the display in the ticker tape;

comparing, by the domain name server, the first thumbnail images to the second thumbnail images;

determining, by the domain name server, an image difference between corresponding ones of the first thumbnail images and the second thumbnail images; and processing, by the domain name system, the image difference for the display.

* * * * *